(12) United States Patent
Caldwell et al.

(10) Patent No.: US 12,187,324 B2
(45) Date of Patent: Jan. 7, 2025

(54) TRAJECTORY PREDICTION BASED ON A DECISION TREE

(71) Applicant: Zoox, Inc., Foster City, CA (US)

(72) Inventors: Timothy Caldwell, Mountain View, CA (US); Xianan Huang, Foster City, CA (US); Joseph Lorenzetti, Foster City, CA (US); Yunpeng Pan, Newark, CA (US); Ke Sun, Foster City, CA (US); Linjun Zhang, Canton, MI (US)

(73) Assignee: Zoox, Inc., Foster City, CA (US)

( * ) Notice: Subject to any disclaimer, the term of this patent is extended or adjusted under 35 U.S.C. 154(b) by 212 days.

(21) Appl. No.: 17/900,658

(22) Filed: Aug. 31, 2022

(65) Prior Publication Data

US 2024/0092398 A1 Mar. 21, 2024

(51) Int. Cl.
| | | |
|---|---|---|
| *B60W 60/00* | (2020.01) | |
| *B60W 10/04* | (2006.01) | |
| *B60W 10/18* | (2012.01) | |
| *B60W 10/20* | (2006.01) | |
| *B60W 30/18* | (2012.01) | |

(52) U.S. Cl.
CPC ........ *B60W 60/0027* (2020.02); *B60W 10/04* (2013.01); *B60W 10/18* (2013.01); *B60W 10/20* (2013.01); *B60W 30/18163* (2013.01); *B60W 2552/10* (2020.02); *B60W 2554/4045* (2020.02); *B60W 2554/4046* (2020.02); *B60W 2710/18* (2013.01); *B60W 2710/20* (2013.01); *B60W 2720/106* (2013.01)

(58) Field of Classification Search
CPC .. B60W 60/0027; B60W 10/04; B60W 10/18; B60W 10/20; B60W 30/18163; B60W 2554/4045; B60W 2554/4046; B60W 2552/10; B60W 2710/18; B60W 2710/20; B60W 2720/106
See application file for complete search history.

(56) References Cited

U.S. PATENT DOCUMENTS

| | | | |
|---|---|---|---|
| 2018/0089563 A1* | 3/2018 | Redding | .................. G06N 5/01 |
| 2019/0259292 A1* | 8/2019 | Williams | .......... G06F 18/24323 |
| 2020/0207339 A1 | 7/2020 | Neil | |

(Continued)

FOREIGN PATENT DOCUMENTS

KR 20200019191 A 2/2020

OTHER PUBLICATIONS

The PCT Search Report and Written Opinion mailed on Dec. 8, 2023, for PCT Application No. PCT/US2023/031572 from PCT Summary, 10 pages.

*Primary Examiner* — Naeem Taslim Alam
(74) *Attorney, Agent, or Firm* — Lee & Hayes, P.C.

(57) ABSTRACT

Techniques for determining a vehicle trajectory that causes a vehicle to navigate in an environment relative to one or more objects are described herein. For example, the techniques may include a computing device determining a decision tree having nodes to represent different object intents and/or nodes to represent vehicle actions at a future time. A tree search algorithm can search the decision tree to evaluate potential interactions between the vehicle and the one or more objects over a time period, and output a vehicle trajectory for the vehicle. The vehicle trajectory can be sent to a vehicle computing device for consideration during vehicle planning, which may include simulation.

20 Claims, 6 Drawing Sheets

(56) References Cited

U.S. PATENT DOCUMENTS

| | | | |
|---|---|---|---|
| 2020/0249674 A1* | 8/2020 | Dally | G05D 1/0221 |
| 2021/0370980 A1 | 12/2021 | Ramamoorthy | |
| 2022/0026921 A1 | 1/2022 | Halder | |
| 2023/0053459 A1* | 2/2023 | You | B60W 50/0097 |
| 2023/0182775 A1* | 6/2023 | Beaurepaire | B60W 30/18163 |
| | | | 701/26 |

* cited by examiner

TRAJECTORY PREDICTION BASED ON A DECISION TREE

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting future object trajectories may be used to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
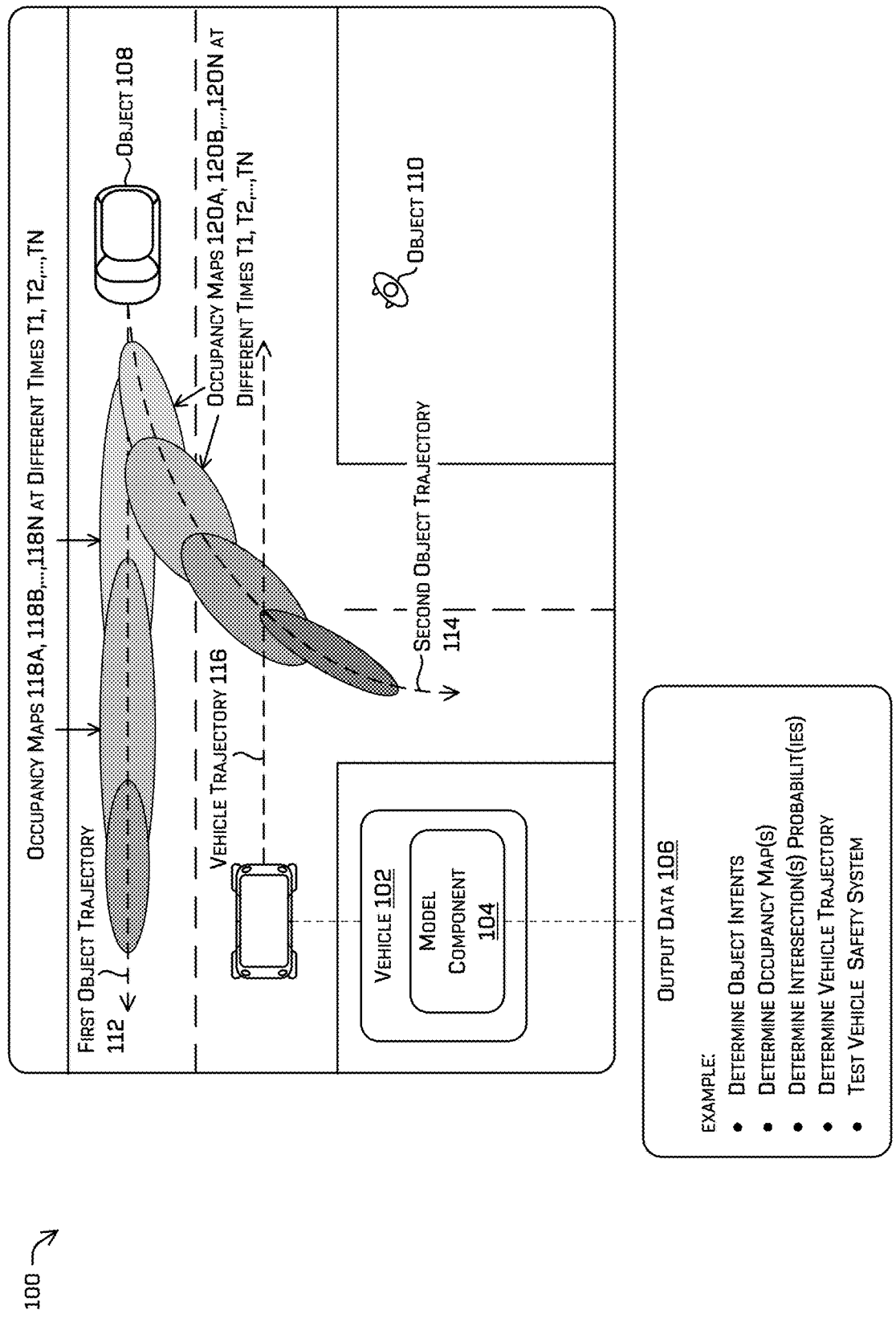
FIG. 1 is an illustration of an example environment, in which an example vehicle applies a model to predict occupancy of one or more example objects at a future time.

This application describes techniques for determining a vehicle trajectory that causes a vehicle to navigate in an environment relative to one or more objects. A computing device can generate a decision tree having nodes to represent different object intents and/or nodes to represent vehicle actions at a future time. A tree search algorithm can search the decision tree thereby evaluating potential interactions between the vehicle and the one or more objects over a time period. The tree search algorithm can be optimized to generate an output (e.g., the vehicle trajectory) after searching a particular number of branches, nodes, or scenarios, and determine whether continuing to search additional portions of the decision tree and/or generating a new branch or node of the decision tree to continuously update the vehicle trajectory prediction. By using the decision tree as described herein, object intents (e.g., levels of attentiveness of the object to react to the vehicle) may be considered during vehicle planning thereby improving vehicle safety as a vehicle navigates in the environment by planning for the possibility that an object may intersect with the vehicle.

Generating the decision tree can include the computing device determining whether to add, remove, or modify nodes, branches, etc. of the decision tree (e.g., prior to or during application of the tree search algorithm). In some examples, the computing device can receive data (e.g., sensor data, map data, object state data, vehicle state data, control policy data, etc.) and determine multiple object trajectories that an object may take at a future time. For each object trajectory, the computing device can output an occupancy map at various time intervals (e.g., every 0.1 second for 8 seconds) thereby capturing a "local" uncertainty of the object position at different times in the future. The decision tree can represent potential interactions between the vehicle and the object with consideration to potential actions by the object including predetermining a level of responsiveness, or attentiveness, for the object relative to the vehicle when taking the potential actions. In some examples, the computing device can output a distribution of data representing object behavior over time during multiple scenarios, and determine a vehicle trajectory based at least in part on the distribution of data.

In various examples, the computing device can determine a set of samples, or conditions, for consideration during the scenarios. For example, the set of samples can indicate a control policy for the vehicle and/or the object(s) in the environment as well as traffic rules, signal information, or other map features of the environment. In some examples, the set of samples can indicate an attribute (e.g., position, class, velocity, acceleration, yaw, turn signal status, etc.) of an object, history of the object (e.g., location history, velocity history, etc.), an attribute of the vehicle (e.g., velocity, position, etc.), crosswalk permission, traffic light permission, and the like. The set of samples can be associated with nodes of the decision tree to cause scenarios to be tailored to at least some conditions. Thus, the decision tree can represent scenarios that include information associated with the set of samples to determine a potential intersection with an object, and optionally, a vehicle trajectory to avoid the potential intersection.

In some examples, a computing device may implement a model component comprising one or more machine learned models to predict a future characteristic (e.g., a state, an action, etc.) for an object (e.g., a bicycle, a pedestrian, another vehicle, an animal, etc.) that may result in an impact to operation of an autonomous vehicle. For instance, a machine learned model may determine multiple trajectories (e.g., direction, speed, and/or acceleration) for an object to follow in an environment at a future time. In such an example, a vehicle computer device of the autonomous vehicle may predict a candidate trajectory for the vehicle (using a same or different model) with consideration to an output (e.g., the object trajectories) from the machine learned model thereby improving vehicle safety by providing the autonomous vehicle with a trajectory that is capable of safely avoiding the potential future positions of the object that may impact operation of the vehicle (e.g., intersect a trajectory of the autonomous vehicle, cause the autonomous vehicle to swerve or brake hard, etc.).

In some examples, the model component can implement a decision tree that evaluates future positions of multiple objects (at least one object having multiple object intents) in a simulated environment to determine a response by the vehicle to the objects including various levels of responsiveness by one or more of the objects. In some examples, a vehicle computing device can control the vehicle in a real-world environment based at least in part on the response.

In some examples, the model component may receive data associated with one or more objects in the environment for generating the decision tree. For instance, the model component can receive (or in some examples determine) one or more of position data, orientation data, heading data, velocity data, speed data, acceleration data, yaw rate data, or turning rate data associated with the object at various times. In various examples, the model component can determine a rate of braking, steering, or acceleration for the object to operate in the environment and/or take an action relative to the vehicle based at least in part on the data. For example, the object can be associated with different thresholds for maximum braking, maximum acceleration, maximum steering rate, and the like, thereby capturing different potential behaviors by the object (e.g., the object can react with different levels of attentiveness to the vehicle).

In various examples, the decision tree can determine actions for the vehicle to take while operating (e.g., trajectories to use to control the vehicle) based on one or more outputs by the decision tree. For example, the decision tree can include a node for potential vehicle actions. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

For each applicable action and sub-action, the vehicle computing system may implement different model(s) and/or component(s) to simulate future states (e.g., estimated states) by projecting an autonomous vehicle and relevant object(s) forward in the environment for the period of time (e.g., 5 seconds, 8 seconds, 12 seconds, etc.). The model(s) may project the object(s) (e.g., estimate future positions of the object(s)) forward based on a predicted trajectory associated therewith. The model(s) may predict a trajectory of a vehicle and predict attributes about the vehicle including whether the trajectory will be used by the vehicle to arrive at a predicted location in the future. The vehicle computing device may project the vehicle (e.g., estimate future positions of the vehicle) forward based on the vehicle trajectories or actions output by the model (with consideration to multiple object intents). The estimated state(s) may represent an estimated position (e.g., estimated location) of the autonomous vehicle and an estimated position of the relevant object(s) at a time in the future. In some examples, the vehicle computing device may determine relative data between the autonomous vehicle and the object(s) in the estimated state(s). In such examples, the relative data may include distances, locations, speeds, directions of travel, and/or other factors between the autonomous vehicle and the object. In various examples, the vehicle computing device may determine estimated states at a pre-determined rate (e.g., 10 Hertz, 20 Hertz, 50 Hertz, etc.). In at least one example, the estimated states may be performed at a rate of 10 Hertz (e.g., 80 estimated intents over an 8 second period of time).

In various examples, the vehicle computing system may store sensor data associated with an actual location of an object at the end of the set of estimated states (e.g., end of the period of time) and use this data as training data to train one or more models. For example, stored sensor data (or perception data derived therefrom) may be retrieved by a model and be used as input data to identify cues of an object (e.g., identify a feature, an attribute, or a pose of the object). Further, detected positions over such a period of time associated with the object may be used to determine a ground truth trajectory to associate with the object. In some examples, the vehicle computing device may provide the data to a remote computing device (i.e., computing device separate from vehicle computing device) for data analysis. In such examples, the remote computing device may analyze the sensor data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so may be determined (either hand labelled or determined by another machine learned model) and such ground truth data may be used to determine a trajectory of an object. In some examples, corresponding data may be input into the model to determine an output (e.g., a trajectory, and so on) and a difference between the determined output, and the actual action by the object (or actual trajectory) may be used to train the model.

The machine learned model may be configured to determine an initial position of each object in an environment (e.g., a physical area in which a vehicle operates and/or a simulated environment) indicated by the sensor data. Each determined or predicted trajectory may represent a potential direction, speed, and acceleration that the object may travel through the environment. The object trajectories predicted by the models described herein may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein may improve a functioning of a vehicle computing system in a number of ways. The vehicle computing system may determine an action for the autonomous vehicle to take based on object trajectories and object intents affecting how the object "reacts" to the vehicle (e.g., different reaction thresholds for different object intents which can be independently tested) to identify less likely actions by an object which, if taken by the object, may not otherwise be considered (e.g., in systems that only consider a most likely action by the object). In some examples, using the trajectory prediction techniques described herein, a model may output a vehicle trajectory based on a decision tree representing object intents that improve safe operation of the vehicle by accurately characterizing motion of the object with greater detail as compared to previous models.

The techniques discussed herein can also improve a functioning of a computing device in a number of additional ways. In some cases, evaluating an output by a model(s) may allow an autonomous vehicle to generate more accurate and/or safer trajectories for the autonomous vehicle to traverse an environment. In at least some examples described herein, predictions based on a decision tree may account for object to object dependencies, yielding safer decision-making of the system. These and other improvements to the functioning of the computing device are discussed herein.

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation, nautical, manufacturing, agricultural, etc. context. Additionally, or alternatively, the techniques described herein can be used with real data (e.g., captured using sensor(s)), simulated data (e.g., generated by a simulator), or any combination thereof.

FIG. 1 illustrates an autonomous vehicle (vehicle 102) in an example environment 100, in which an example model component 104 may process input data to predict a vehicle trajectory. As illustrated, the vehicle 102 includes the model component 104 that represents one or more machine learned models for processing various types of input data (e.g., feature vectors, top-down representation data, sensor data, map data, etc.) associated with the one or more objects in the environment 100, and determines output data 106 representing potential object trajectories, object intents, an occupancy map(s), and/or a vehicle trajectory. In some examples, the prediction techniques described herein may be implemented at least partially by or in association with a vehicle computing device (e.g., vehicle computing device 504) and/or a remote computing device (e.g., computing device(s) 550). Generally, an object intent can represent how an object may react to another object or vehicle in a simulated environment and/or a real-world environment. Throughout the disclosure, such an object intent may comprise a set (e.g., zero, one, or more than one) potential responses of the object to an environmental condition (which may include the action of the autonomous vehicle).

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification.

In various examples, a vehicle computing device associated with the vehicle 102 may be configured to detect one or more objects (e.g., object 108 and object 110) in the environment 100, such as via a perception component. In some examples, the vehicle computing device may detect the objects, based on sensor data received from one or more sensors. In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In various examples, the vehicle 102 may be configured to transmit and/or receive data from other autonomous vehicles and/or the sensors. The data may include sensor data, such as data regarding the objects detected in the environment 100.

In various examples, the vehicle computing device can receive the sensor data and can semantically classify the detected objects (e.g., determine an object type), such as, for example, whether the object is a vehicle, such as object 108, a pedestrian such as object 110, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential trajectories by an object may be considered based on characteristics of the object (e.g., how the object may potentially move in the environment).

Generally, the model component 104 provides functionality to determine a first object trajectory 112 and a second object trajectory 114 associated with the object 108, and determine a vehicle trajectory 116 associated with the vehicle 102. The model component 104 can also or instead predict occupancy maps 118A, 118B, . . . , 118N, (collectively "occupancy maps 118"), where N is an integer and/or predict occupancy maps 120A, 120B, . . . , 120N, (collectively "occupancy maps 120"), where N is an integer. For instance, the model component 104 can output one or more trajectories, object intents, etc. usable in a simulation (also referred to as a scenario or estimated states) to determine a response by the vehicle 102 to the object. In some examples, the model component 104 can generate the output data 106 to represent one or more heat maps. In some examples, the one or more predicted trajectories may be determined or represented using a probabilistic heat map to predict object behavior, such as that described in U.S. patent application Ser. No. 15/807,521, filed Nov. 8, 2017, entitled "Probabilistic Heat Maps for Behavior Prediction," which is incorporated herein by reference in its entirety and for all purposes.

In some examples, the vehicle computing device can determine a first confidence that the object 108 follows the first object trajectory 112 (e.g., a 70% confidence) and a second confidence that the objects 108 follows the second object trajectory 114 (e.g., a 30% confidence). Confidence values may also or instead be associated with the occupancy maps 118 and/or the occupancy maps 120. The confidence values can be used to evaluate the potential interactions between the vehicle and the object 108 or to determine a speed (or other metric) associated with the vehicle trajectory 116 (e.g., to prepare the vehicle 102 for a left-turn by the object 108).

In some examples, the model component 104 may be configured to receive input data representing features of the environment (e.g., a roadway, a crosswalk, a building, etc.), a current state of an object (e.g., the vehicle 108 and/or the pedestrian 110), and/or a current state of the vehicle 102. Additional details about inputs to the model component 104 are provided throughout this disclosure.

In some examples, the model component 104 can represent one or more machine learned models that are configured to determine one or more trajectories, occupancy maps, or intents of additional objects such as the pedestrian 110. For example, the model component 104 can predict that the most likely trajectory for the pedestrian 110 is to stay out of the roadway, but the model component 104 can also predict that the pedestrian 110 will follow another object trajectory that causes the pedestrian 110 to enter the roadway in front of the vehicle 102. The vehicle 102 can prepare for the pedestrian 110 to enter the roadway by determining a vehicle trajectory that takes into consideration multiple object trajectories, or intents, as part of a decision tree as described herein.

Additional details of predicting object behavior using a machine learned model are described in U.S. patent application Ser. No. 17/681,461, filed on Feb. 22, 2022, entitled "Generating Predictions Based On Object Type," which is incorporated herein by reference in its entirety and for all purposes. Additional details of predicting object locations using a machine learned model are described in U.S. patent application Ser. No. 17/535,357, filed on Nov. 24, 2021, entitled "Encoding Relative Object Information Into Node Edge Features," which is incorporated herein by reference in its entirety and for all purposes.

The output data 106 from the model component 104 can be used by a vehicle computing device in a variety of ways. For instance, information about the object trajectories, object intents, and/or sampling conditions can be used by a planning component of the vehicle computing device to control the vehicle 102 in the environment 100 (e.g., determine a trajectory and/or control a propulsion system, a braking system, or a steering system). The output data 106 may also or instead be used to perform a simulation by setting up conditions (e.g., an intersection, a number of objects, a likelihood for the object to exhibit abnormal behavior, etc.) for use during the simulation such as to test a response by a vehicle safety system.

The model component 104 can determine the output data 106 based at least in part on applying a tree search algorithm to the decision tree. For example, the tree search algorithm can execute functions associated with various nodes and sub-nodes to identify a path between nodes having a smallest cost among various paths (including different nodes to represent an object intent, an object trajectory, or a vehicle action, for example). A set of samples can test various potential interactions between the vehicle 102 and the objects in the environment 100. For instance, a sample in the set of samples can represent an instantiation of an object intent(s), which may be of multiple potential intents, relative to different vehicle actions. In various examples, the model component 104 can group object intents having similar outcomes into a same node. For example, a node can convey results of testing different samples including grouping object intents, object trajectories, etc. that exhibits a same object position and object velocity at the end of testing each sample in the set of samples. For example a first node of the decision tree can include an object intent (e.g., a left turn) associated with an object, and a second node can include a set of object intents associated with the object. In some examples, multiple object intents in the set of object intents can include a same intent, such as the object going straight in the future.

In some examples, a first object intent of a first object can be associated with a first node and a second object intent of a second object can be associated with a second node (e.g., a decision tree can include two or more objects each having one or more intents). Additional detail for determining nodes and samples is discussed throughout this disclosure.

A training component of a remote computing device, such as the computing device(s) 550 (not shown) and/or the vehicle computing device 504 (not shown) may be implemented to train the model component 104. Training data may include a wide variety of data, such as image data, video data, lidar data, radar data, audio data, other sensor data, etc., that is associated with a value (e.g., a desired classification, inference, prediction, etc.). In some examples training data can comprise determinations based on sensor data, such as a bounding boxes (e.g., two-dimensional and/or three-dimensional bounding boxes associated with an object), segmentation information, classification information, an object trajectory, and the like. Such training data may generally be referred to as a "ground truth." To illustrate, the training data may be used for image classification and, as such, may include an image of an environment that is captured by an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as ground truth. Training the model component 104 can improve vehicle trajectory determinations over time by learning how to construct the decision tree to produce an optimized result.

Figure 2:
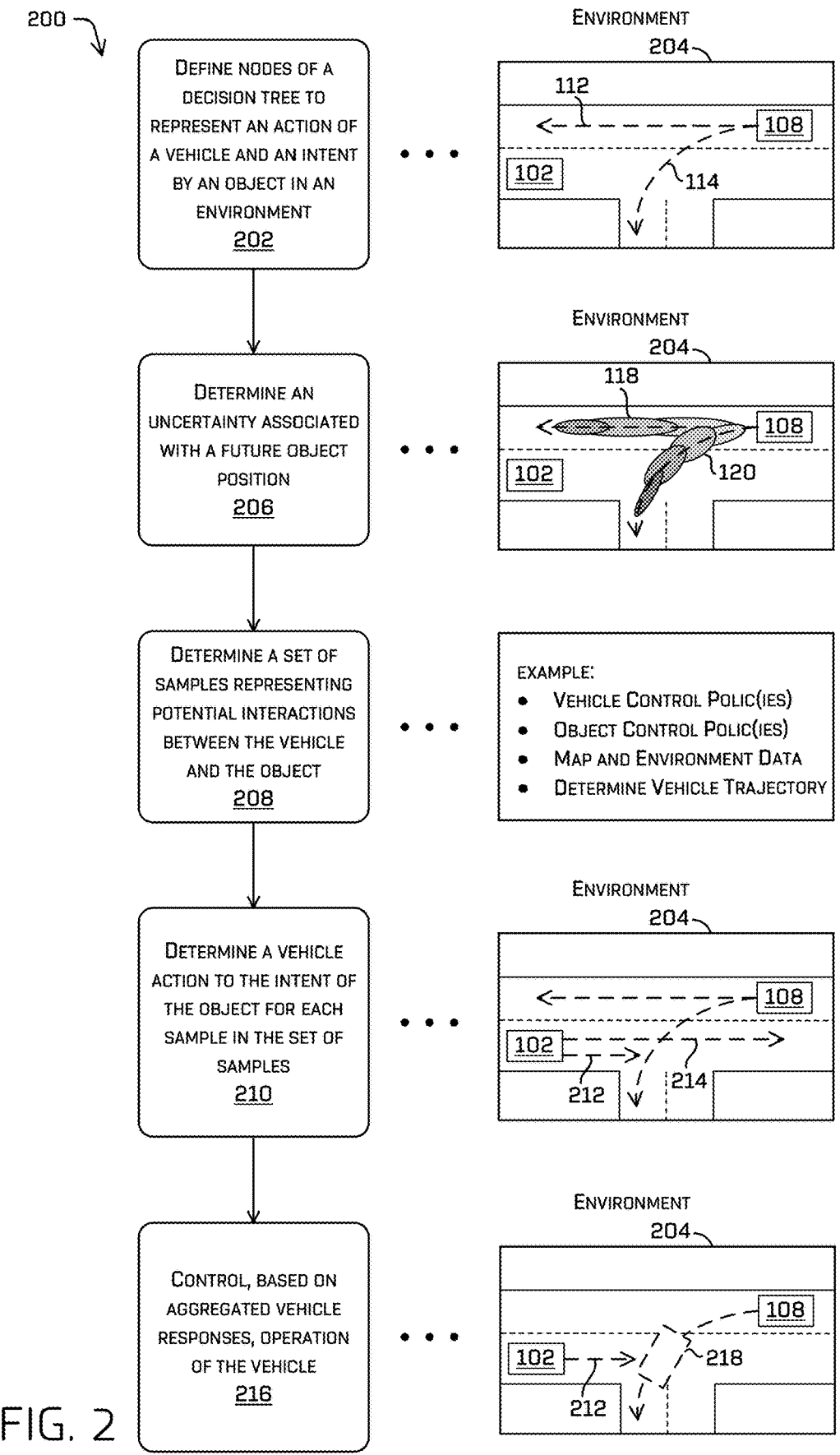
FIG. 2 is a pictorial flow diagram of an example process for controlling an example vehicle based on an occupancy prediction output from a model.

FIG. 2 is a pictorial flow diagram of an example process 200 for controlling a vehicle (e.g., vehicle 102 or vehicle 502) based on an occupancy prediction output from a model. The example process 200 may be implemented by a computing device such as the vehicle computing device 504 and/or the vehicle safety system 534 of FIG. 5. In some examples, the techniques described in relation to FIG. 2 can be performed as the vehicle 102 navigates in the environment 100 (e.g., a real-world environment or a simulated environment).

An operation 202 can include defining nodes of a decision tree to represent an action of a vehicle and an intent by an object in an environment. In some examples, defining a node can include generating a node to represent multiple object intents. For example, a first node (or object intent thereof) of the decision tree can represent a characteristic (e.g., a state or an action) of an object such as one or more of a yield action, a drive straight action, a left turn action, a right turn action, a brake action, an acceleration action, a steering action, or a lane change action, and a second node can represent an action or state associated with the vehicle 102 (e.g., one of a yield action, a drive straight action, a left turn action, a right turn action, a brake action, an acceleration action, a steering action, or a lane change action).

In some examples, the operation 202 can include the vehicle 102 implementing the model component 104 to associate a first node with a vehicle action, a second node with a second vehicle action, a third node with a first object intent, a fourth node with a second object intent, and so on. The decision tree can represent one or more objects (e.g., the vehicle 108) in an environment 204 (e.g., a simulated environment or a real-world environment). In various examples, the environment 204 can correspond to the environment 100 of FIG. 1. For example, additional nodes can represent an action, state, and/or intent of an additional object, and so on. In some examples, a single node can represent potential interactions between two or more objects relative to one another and/or relative to the vehicle.

In various examples, the computing device can generate the decision tree based at least in part on state data associated with a vehicle and/or object(s). The state data can include data describing an object (e.g., the vehicle 108, the pedestrian 110 in FIG. 1) and/or a vehicle (e.g., vehicle 102) in an environment, such as in example environment 100. The state data can include, in various examples, one or more of position data, orientation data, heading data, velocity data, speed data, acceleration data, yaw rate data, or turning rate data associated with the object and/or the vehicle.

An operation 206 can include determining an uncertainty associated with a future object position. For example, the operation 206 can include the vehicle 102 implementing the model component 104 to receive one or more object trajectories usable to determine the occupancy maps 118 and/or the occupancy maps 120 associated with the object 108 at different times in the future. In various examples, the occupancy maps 118 and/or the occupancy maps 120 can represent future object positions at various times in the future.

An operation 208 can include determining a set of samples representing potential interactions between the vehicle and the object. For example, the operation 208 can include the vehicle 102 implementing the model component 104 to determine data representing vehicle control policies, object control policies, map data, environment data, and the like, and send the data to the model component 104 for inclusion in a decision tree. Thus, the set of samples can model potential interactions that can include different object intents that cause different future actions by the vehicle 102. A sample of the set of samples can, for example, represent a discrete selection or combination of potential interactions from various sets of possibilities (e.g., a particular scenario with street intersections, traffic rules, multiple objects having different intents, and so on). Each sample in the set of samples can, for instance, represent various types of object behavior to capture potential actions by the object that are both likely (e.g., the object goes straight) and unlikely (e.g., the object turns in front of the vehicle unexpectedly). Accordingly, determining responses to the set of samples collectively can capture a variety of object behavior and vehicle actions which can improve determinations that are based on the set of samples.

An operation 210 can include determining a vehicle action (or reaction) to the intent of the object for each sample in the set of samples. For example, the operation 210 can include the vehicle 102 implementing the model component 104 to determine a vehicle trajectory for each sample scenario in the set of samples. The model component 104 may, for instance, determine a first vehicle trajectory 212 associated with a first sample and a second vehicle trajectory 214 associated with a second sample.

An operation 216 can include controlling, based on aggregated vehicle responses, operation of the vehicle. For example, the operation 216 can include the vehicle computing device determining a cost for each sample in the set of samples, and aggregating the costs (e.g., weighted average, etc.) to determine a candidate vehicle trajectory for sending to the planning component of the vehicle computing device. The vehicle trajectory can be based at least in part on a lowest cost to traverse the decision tree.

Figure 3:
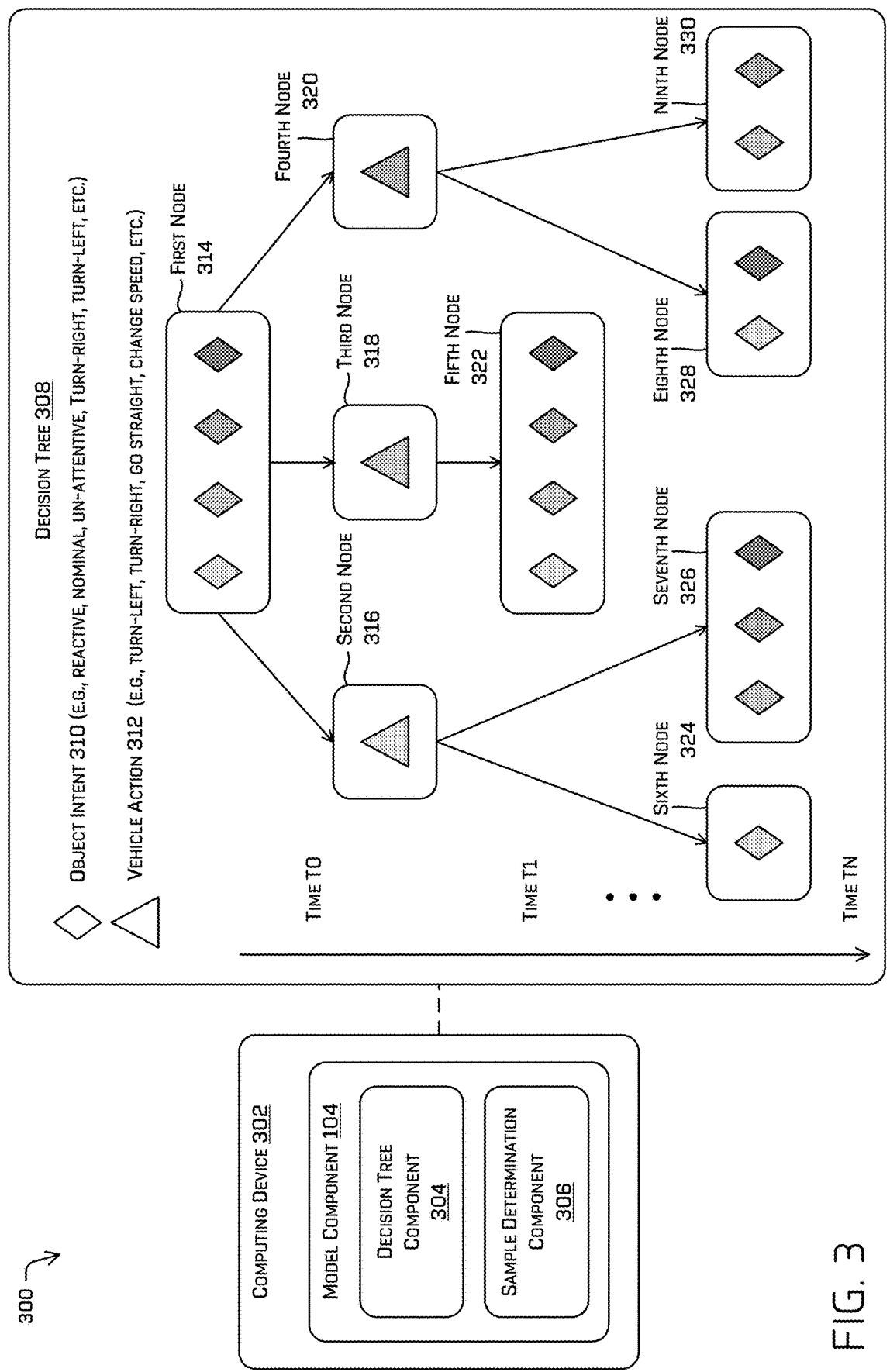
FIG. 3 illustrates an example block diagram of an example computer architecture for implementing techniques to generate an example decision tree as described herein.

FIG. 3 illustrates an example block diagram 300 of an example computer architecture for implementing techniques to generate an example decision tree as described herein. The example 300 includes a computing device 302 (e.g., the vehicle computing device(s) 504 and/or the computing device(s) 550) comprising the model component 104 of FIG. 1. In some examples, the techniques described in relation to FIG. 3 can be performed as the vehicle 102 navigates in the environment 100.

As depicted in FIG. 3, the model component 104 comprises a decision tree component 304 and a sample determination component 306. The decision tree component 304 can be configured to manage nodes of a decision tree 308 including determining a number of nodes and/or types of intents, adding a node, removing a node, etc. The sample determination component 306 can be configured to determine samples for identifying whether the vehicle and the object intersect. The decision tree 308 comprises one or more object intents 310 (e.g., a future action) and one or more vehicle actions 312 (e.g., a turning action, braking action, acceleration action such as yielding to or slowing for an object to safely enter in front of the vehicle). Object intents can represent a level of attentiveness of the object, such as whether the object will react to the vehicle with a first level of reactiveness or a second level of reactiveness, or in some cases, not react to the vehicle during a sample. In various examples, different levels of reactiveness can be associated with different maximum thresholds for the object to accelerate, brake, or steer. The object intent 310 can include, for example, one or more of a) a reactive intent in which an object changes lanes, brakes, accelerates, decelerates, etc. relative to the vehicle, b) a nominal intent in which the object changes lanes, brakes, accelerates, decelerates, etc. less aggressively than the reactive intent such as decelerate to allow the vehicle to lane change, c) an unattentive intent in which the object refrains from reacting to the vehicle, d) a right turn intent, e) a left turn intent, f) a straight intent, g) an accelerating intent, h) a decelerating intent, i) a parking intent, j) a remain in place intent, etc.).

In some examples, the object intents of the decision tree 308 can be associated with a most relevant object(s) to the vehicle. For example, the decision tree component 304 can receive one or more objects determined to be relevant to the vehicle by another machine learned model configured to identify a relevant object from among a set of objects in an environment of the vehicle. The machine learned model can determine the relevant object based at least in part on a relevancy score associated with each object in the set of objects and/or object(s) within a threshold distance from the vehicle. Additional examples of determining relevance of an object are described in U.S. patent application Ser. No. 16/530,515, filed on Aug. 2, 2019, entitled "Relevant Object Detection," Ser. No. 16/417,260, filed on May 30, 2019, entitled "Object Relevance Determination," and Ser. No. 16/389,720, filed on May 6, 2019, entitled "Dynamic Object Relevance Determination," all of which are incorporated herein by reference in their entirety and for all purposes.

In some examples, a node(s) of the decision tree 308 can be associated with one or more regions surrounding the vehicle (e.g., a region most likely to include a potential intersection point with an object. For example, the decision tree component 304 can receive one or more regions by the model component 104, or another machine learned model, configured to identify a relevant region from among a set of regions in an environment of the vehicle. For instance, the decision tree can include node(s) to represent an occluded region, a region in front of the vehicle, or other area within a predetermined distance of the vehicle. In some examples, the vehicle is a bi-directional vehicle, and as such, the model component 104 can define, identify, or otherwise determine the rear region relative to a direction of travel as the vehicle navigates in the environment. For instance, the rear region of the vehicle can change depending upon the direction of travel. In at least some examples, the environment may be encoded as a vector representation and output from a machine learned model as an embedding. Such an embedding may be used in predicting the future state(s) or intent(s) of the object.

The decision tree includes a first node 314, a second node 316, a third node 318, a fourth node 320, a fifth node 322, a sixth node 324, a seventh node 326, an eighth node 328, and a ninth node 330, though other number of nodes are possible. For instance, the first node 314 can include four different object intents as depicted by different shading. The second node 316, the third node 318, and the fourth node 320 can be associated with corresponding vehicle actions (e.g., a proposed action or action for the vehicle to take in the future). In various examples, the second node 316, the third node 318, and/or the fourth node 320 can represent actions for applying to the vehicle over a period of time.

In the example illustrated, intents grouped together may either elicit a similar or same response from the vehicle and/or have substantially similar probabilities/confidences/likelihoods of occurrence. As illustrated, taking certain actions by the vehicle may aid in differentiating a response of the object as illustrated by varying groupings of object intents in response to vehicle actions. Further differentiation of the object intents may, in some instances, yield better responses by the vehicle to the environment (e.g., safer, more efficient, more comfortable, etc.).

The decision tree 308 is associated with a period of time as shown in FIG. 3. For example, time T0 represents a first time of the decision tree 308 and is generally associated with the first node 314 and the second node 316. Each progression of the decision tree 308 to a new node does not necessarily imply a new time (e.g., T0, T1, etc. is not scaled to the nodes in FIG. 3 but used to show a progression of time generally). In some examples, each layer of the decision tree can be associated with a particular time (e.g., the first node 314, the second node 316, the third node 318, and the fourth node 320 are associated with time T0, the fifth node 322, the sixth node 324, the seventh node 326, the eighth node 328, and the ninth node 330 are associated with time T1, and so on for additional branches or nodes (not shown) up to time TN, where N is an integer. In various examples, different layers, branches, or nodes can be associated with different times in the future. In various examples, scenarios associated with one or more of the nodes of the decision tree 308 can run in parallel on one or more processors (e.g., Graphics Processing Unit (GPU) and/or Tensor Processing Unit (TPU), etc.).

In some examples, at time T1 the vehicle takes an action associated with the third node 318 at the fifth node 322, followed by additional scenarios to test how the vehicle responds to the four object intents of the fifth node 322. Thus, the fifth node 322 can represent multiple scenarios over a time period. Further, the decision tree 308 can represent a vehicle action associated with the second node 316, and perform additional tests at time T1 to determine how the vehicle responds to the object intent of the sixth node 324 (e.g., turn left intent) and the three object intents of the seventh node 326. In some examples, the three object intents of the seventh node 326 can include a same outcome, such as the object having a straight intent but each straight intent may be associated with different levels of response to the vehicle (e.g., different velocities, accelerations, and/or braking capabilities). In various examples, the sixth node 324 (or another node having a single object intent) enables evaluation of a specific object intent (e.g., a left turn that is less likely to occur that, for example, the object continuing straight and not turning left) on the vehicle trajectory determination.

In various examples, a different vehicle action at the fourth node 320 can cause additional tests (scenarios) to be performed to determine how the vehicle responds to the two object intents of the eighth node 328 and the two object intents of the ninth node 330.

Note that in the depicted example in FIG. 3, the nodes after the vehicle actions in time (e.g., nodes 316, 318, and 320) can be considered sub-nodes, or child nodes, and the total number of object intents between sub-nodes equals an amount of object intents in the first node 314. For example, the sixth node 324 and the seventh node 326 have four object intents combined, which is equal to the four object intents of the first node 314. In other examples, however, the object intents can change between nodes and the number of object intents can also vary by node (e.g., may be more or less than the number of object intents in the first node of the decision tree).

In some examples, additional nodes (not shown) can be searched in the decision tree 308 to test another object intent or group of object intents. For example, at time T2, a new set of samples and/or a new set of object intents can be associated with a node of the decision tree 308 based at least in part on an output of a previous node. In some examples, anew combination of object intents can be assigned to anode by the model component 104 to further consider different object actions when determining a vehicle trajectory. By receiving a new set of samples different from the set of samples used in previous nodes, nodes of the decision tree 308 can be "re-sampled" dynamically during a tree search, for example.

In various examples, the decision tree component 304 can generate the decision tree 308 based at least in part on one or more of an attribute (e.g., position, velocity, acceleration, yaw, etc.) of the object 108, history of the object 108 (e.g., location history, velocity history, etc.), an attribute of the vehicle 102 (e.g., velocity, position, etc.), and/or features of the environment (e.g., roadway boundary, roadway centerline, crosswalk permission, traffic light permission, and the like). In some examples, a node of the decision tree 308 can be associated with various costs (e.g., comfort cost, safety cost, distance cost, brake cost, obstacle cost, etc.) usable for determining a potential intersection point between the vehicle and the object in the future.

In some examples, the computing device 302 can implement the decision tree component 304 to generate the decision tree 308 based at least in part on state data associated with the vehicle and one or more objects in an environment. The state data can include data describing an object(s) (e.g., the vehicle 108, the pedestrian 110 in FIG. 1) and/or a vehicle (e.g., vehicle 102) in an environment, such as in example environment 100. The state data can include, in various examples, one or more of position data, orientation data, heading data, velocity data, speed data, acceleration data, yaw rate data, or turning rate data associated with the object(s) and/or the vehicle.

Generally, the sample determination component 306 can provide functionality to identify, generate, or otherwise determine a set of samples representing different simulation scenarios. For instance, the sample determination component 306 can identify one or more samples for executing in association with individual nodes of the decision tree 308 (e.g., samples for testing an object intent, vehicle action, etc.). In a non-limiting example, the sample determination component 306 can identify samples for testing the three object intents of the seventh node 326 responsive to the vehicle action at the second node 316.

In various examples, the decision tree component 304 and/or the sample determination component 306 can assign a particular number of object intents to different nodes. For example, the decision tree component 304 can predict a vehicle trajectory based on three different object intents to the seventh node 326 and one object intent to the sixth node 324. In such an example, the object intents of the seventh node 326 can be considered collectively before determining a vehicle trajectory based on an output by the seventh node 326. Whether or not the environment includes dynamic objects, the decision tree component 304 and/or the sample determination component 306 can also or instead assign an intent to one or more regions to indicate an intent of an object (if one exists) in the regions. An occluded region can be associated with various possible object intents that may emerge from the occluded region at a later time.

In some examples, costs associated with anode, sample, or scenario (e.g., a cost for the vehicle to take an action) can be compared to a risk threshold value, and a vehicle trajectory can be output for use by the vehicle computing device when the costs are below the risk threshold. In some examples, the decision tree component 304 can aggregate costs associated with the node, sample, or scenario, and determine the vehicle trajectory based at least in part on the aggregated costs. By way of example and not limitation, the decision tree 308 can consider 40 actions in 100 samples with objects having 4 different intents.

In some examples, the decision tree component 304 can use a heuristic and/or a machine learned model to determine whether to expand a branch or node of the decision tree 308. For instance, the machine learned model can be trained to determine whether to expand child branch/node, group portions of all intents, expand leaf node upper and lower bounds for determining optimal trajectory.

Figure 4:
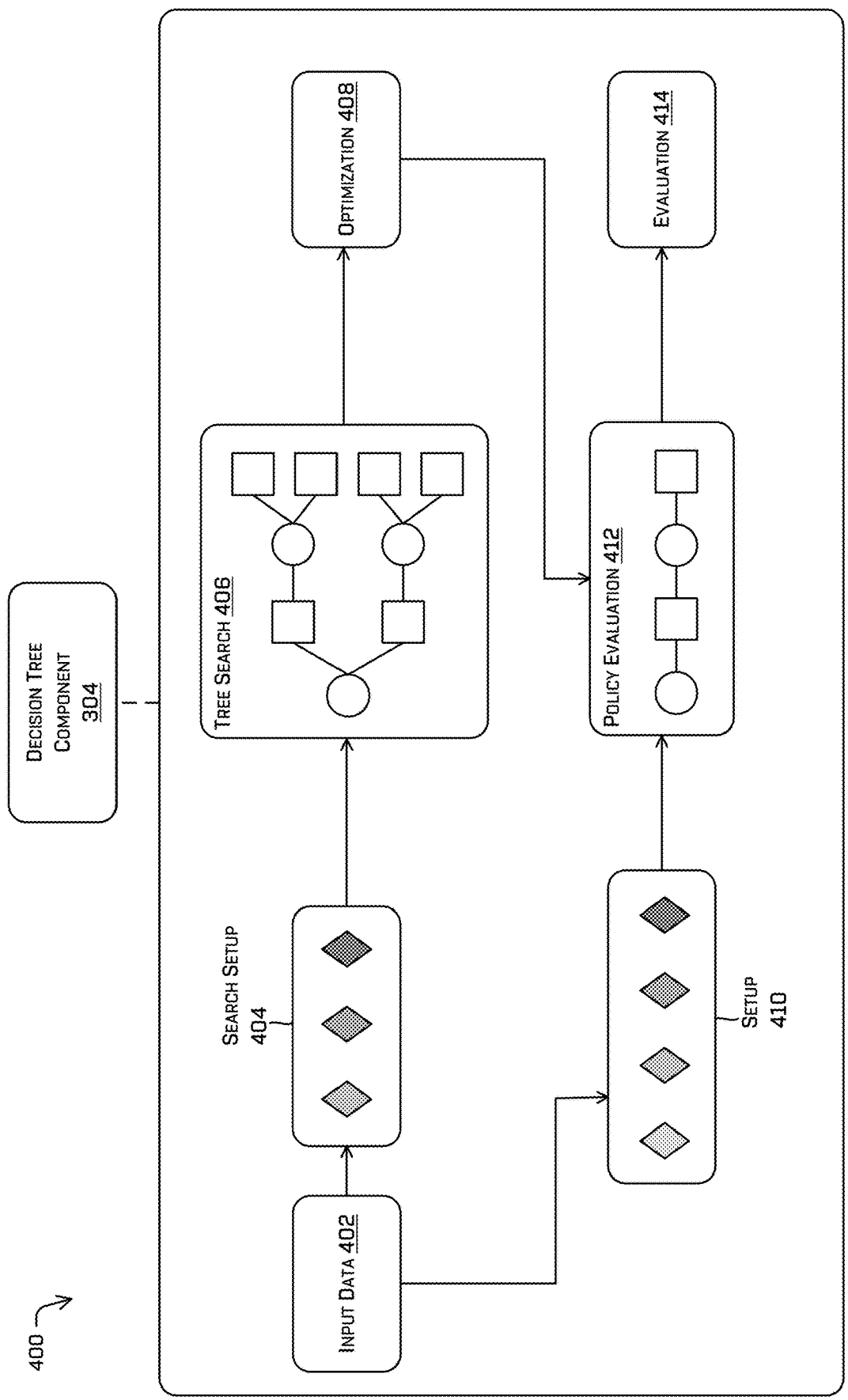
FIG. 4 illustrates an example block diagram of an example computer architecture for implementing techniques to evaluate outputs by an example decision tree as described herein.

FIG. 4 illustrates an example block diagram 400 of an example computer architecture for implementing techniques to evaluate outputs by an example decision tree as described herein. The techniques described in the example 400 may be performed by a computing device such as the computing device 302, the vehicle computing device(s) 504, and/or the computing device(s) 550.

Input data 402 (e.g., log data, sensor data, map data, object state data, vehicle state data, control policy data, etc.) can be used by the decision tree component 304 to perform a search setup 404 (e.g., determine a first search algorithm, determine a number of samples for a tree search, etc.). In various examples, the search setup 404 can include identifying a search algorithm to search a decision tree by a first computing device (e.g., the vehicle computing device(s) 504) having fewer computational resources than a second computing device (e.g., the computing device(s) 550). In some examples, the search setup 404 can include determining a set of object intents for one or more objects in an environment, and assigning intents to different nodes of a decision tree (such as the decision tree 308). The search setup 404 can also or instead include determining conditions for testing a response to the object intents by a vehicle controller, or other device configured to control operation of the vehicle. The decision tree component 304 can apply a tree search algorithm to perform a tree search 406 based at least in part on the search setup 404. The tree search algorithm can, for example, initiate one or more scenarios for determining future positions of the objects based on the various object intents. Thus, the tree search 406 can represent various potential interactions between an object relative to another object and/or an object relative to an autonomous vehicle.

Generally, the nodes of the decision tree 308 represent a "belief" state of an environment, object, vehicle, etc. rather than an actual state of the environment, object, etc. For example, the "belief" state can represent a future state or a simulated state of an object, an autonomous vehicle, an environment, etc. In some examples, the "belief" state can associated with a future time as part of a sample or scenario. The "belief" state can represent, for example, multiple object intents such as in examples when two different object intents result in a same state over a period of time. In various examples, the "belief" state node(s) can represent an uncertainty of a state associated with one or more objects. In some examples, the "belief" state node(s) can represent a probability distribution over states (e.g., an object position, etc.) associated with a time period.

The decision tree component 304 can perform optimization 408 to optimize the vehicle trajectory output as a result of the tree search 406 (e.g., a vehicle trajectory determined by the vehicle). For example, a machine learned model can perform a global optimization technique to improve accuracy of the vehicle trajectory to avoid the object. In some examples, a tree search algorithm associated with the tree search 406 can be optimized separately by compare outcomes of the one or more scenarios and identify paths between nodes that determine a vehicle trajectory for the vehicle to follow in the environment. Potential interactions between an object and a vehicle can be tested in the one or more scenarios based on the object intents associated with each node. In some examples, the computing device 302 can implement a machine learned model to determine whether to continue to another node, or add a new node, to the decision tree based at least in part on identifying a likelihood for an addition node to cause an improvement in a vehicle trajectory determination above a threshold value. In some examples, the decision tree component 304 can determine a cost gap distribution (or other approach) to add another node to reduce a "gap cost" between the predicted vehicle trajectory and actual trajectory by the vehicle.

As shown in FIG. 4, the decision tree component 304 can determine a setup 410 based at least in part on the input data 402. The setup 410 can include a same number or different number of object intents than those of the search setup 404. In various examples, the second search setup can include identifying an algorithm to evaluate an output of the decision tree or optimization 408 by a second computing device (e.g., the computing device(s) 550) having greater computational resources than the first computing device associated with the search setup 404 (e.g., the vehicle computing device(s) 504). Accordingly, the setup 410 can include determining a greater number of samples (e.g., 1000 or some other number) versus a number of samples associated with the search setup 404 (e.g., 3 or some other number) and/or a different algorithm to evaluate the optimized vehicle trajectory from the optimization 408. The setup 410 can also or instead identify a set of policies associated with the vehicle and/or one or more object in the environment to evaluate a vehicle trajectory output by the tree search 406 or an optimized vehicle trajectory output by the optimization 408.

In various examples, the decision tree component 308 can perform a policy evaluation 412 based at least in part on an output of the tree search 406, the optimization 408, and/or the setup 410. Generally, the policy evaluation 412 represents testing the output of the tree search 406 and/or the optimization 408 in relation to the set of policies in the setup 410. The policy evaluation 412 can, for instance, use an algorithm that is trained based at least in part on previous results to improve determinations over time (e.g., predict more accurate vehicle trajectories) compared to the tree search 406. In some examples, the policy evaluation 412 can represent an intent distribution associated with the object intents of the setup 410. In a non-limiting example, the policy evaluation 412 can represent an open-loop trajectory evaluation.

In some examples, the decision tree component 304 can perform evaluation 414 including determining metrics for evaluating performance of an algorithm such as a tree search algorithm (e.g., an accuracy of a vehicle trajectory, a rate to determine an output, a size of the decision tree, whether to add or remove nodes from the decision tree, etc.). In some examples, the evaluation 414 can include determining costs associated with a scenario, and aggregating the costs (e.g., weighted average, etc.) of a node or multiple modes of the decision tree. In some examples, a node of the decision tree 308 can be associated with various costs (e.g., comfort cost, safety cost, distance cost, brake cost, obstacle cost, etc.) usable for determining a potential intersection point between the vehicle and the object in the future.

Figure 5:
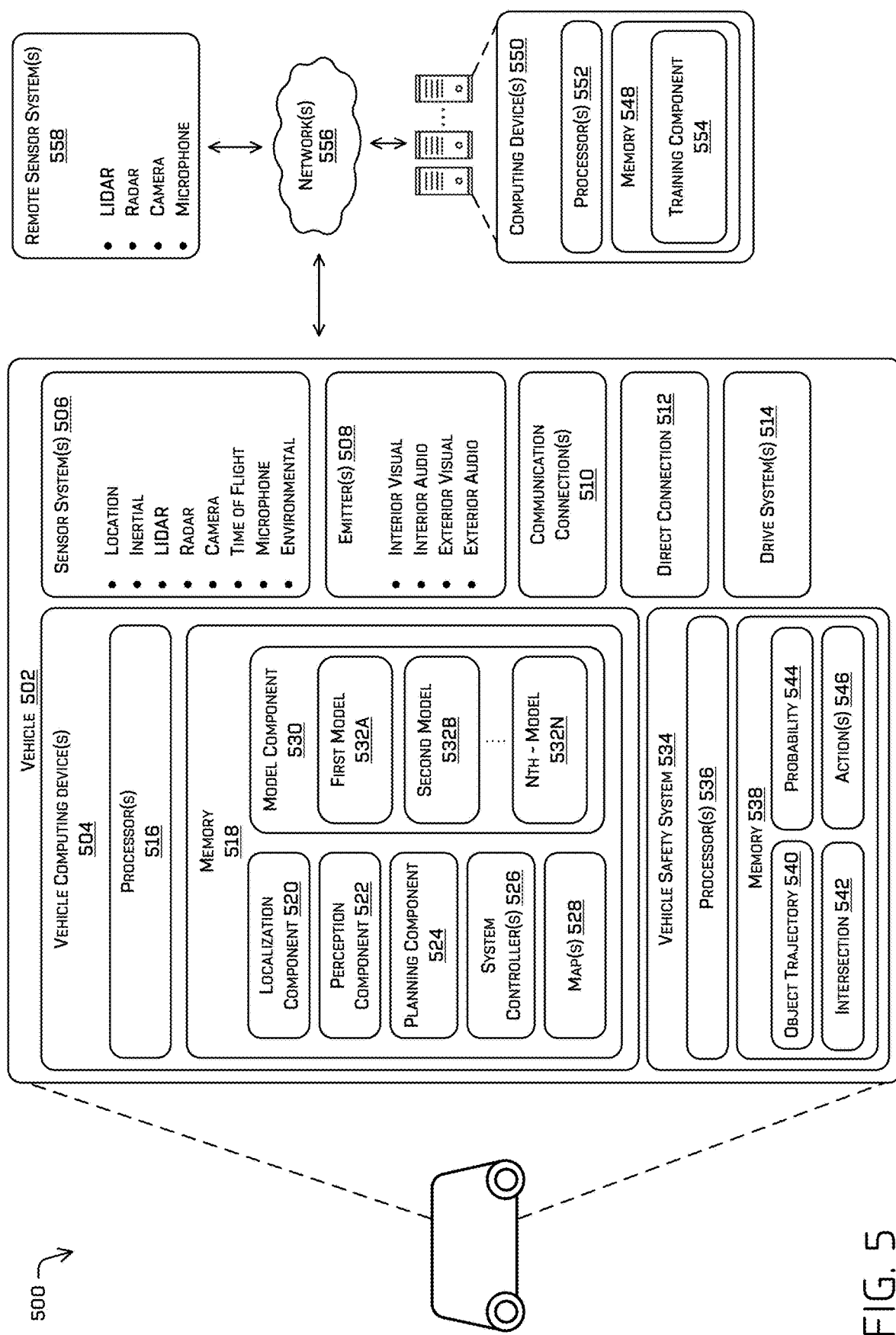
FIG. 5 is a block diagram of an example system for implementing the techniques described herein.

FIG. 5 is a block diagram of an example system 500 for implementing the techniques described herein. In at least one example, the system 500 may include a vehicle, such as vehicle 502.

The vehicle 502 may include a vehicle computing device 504 (also referred to as a vehicle computing device 504 or vehicle computing device(s) 504), one or more sensor systems 506, one or more emitters 508, one or more communication connections 510, at least one direct connection 512, and one or more drive systems 514.

The vehicle computing device(s) 504 may include one or more processors 516 and memory 518 communicatively coupled with the one or more processors 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In the illustrated example, the memory 518 of the vehicle computing device 504 stores a localization component 520, a perception component 522, a planning component 524, one or more system controllers 526, one or more maps 528, and a model component 530 including one or more models, such as a first model 532A, a second model 532B, up to an Nth model 532N (collectively "models 532"), where N can be any integer greater than 1. Though depicted in FIG. 5 as residing in the memory 518 for illustrative purposes, it is contemplated that the localization component 520, the perception component 522, the planning component 524, the one or more system controllers 526, the one or more maps 528, and/or the model component 530 including the models 532 may additionally, or alternatively, be accessible to the vehicle 502 (e.g., stored on, or otherwise accessible by, memory remote from the vehicle 502, such as, for example, on memory 548 of a remote computing device 550).

Additionally, vehicle 502 may include a vehicle safety system 534, including an object trajectory component 540, an intersection component 542, a probability component 544, and an action component 546. As shown in this example, the vehicle safety system 534 may be implemented separately from the vehicle computing device(s) 504, for example, for improved performance of the vehicle safety system, and/or to provide redundancy, error checking, and/or validation of determinations and/or commands determined by the vehicle computing device(s) 504. However, in other examples, the vehicle safety system 534 may be implemented as one or more components within the same vehicle computing device(s) 504.

By way of example, the vehicle computing device(s) 504 may be considered to be a primary system, while the vehicle safety system 534 may be considered to be a secondary system. The primary system may generally perform processing to control how the vehicle maneuvers within an environment. The primary system may implement various artificial intelligence (AI) techniques, such as machine learning, to understand an environment around the vehicle 502 and/or instruct the vehicle 502 to move within the environment. For example, the primary system may implement the AI techniques to localize the vehicle, detect objects around the vehicle, segment sensor data, determine classifications of the objects, predict object tracks, generate trajectories for the vehicle 502 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 506.

In some examples, the vehicle safety system 534 may operate as separate system that receives state data (e.g., perception data) based on the sensor data and AI techniques implemented by the primary system (e.g., vehicle computing device(s) 504), and may perform various techniques described herein for improving collision prediction and avoidance by the vehicle 502. As described herein, the vehicle safety system 534 may implement techniques for predicting intersections/collisions based on sensor data, as well as probabilistic techniques that are based on positioning, velocity, acceleration, etc. of the vehicle and/or objects around the vehicle. In some examples, the vehicle safety system 534 may process data from sensors, such as a subset of sensor data that is processed by the primary system. To illustrate, the primary system may process lidar data, radar data, image data, depth data, etc., while the vehicle safety system 534 may process just lidar data and/or radar data (and/or time of flight data). In other examples, however, the vehicle safety system 534 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference in its entirety and for all purposes.

Although depicted in FIG. 5 as residing in the memory 518 for illustrative purposes, it is contemplated that the localization component 520, the perception component 522, the planning component 524, the model component 530, the system controllers 526, and the maps 528 may additionally, or alternatively, be accessible to the vehicle 502 (e.g., stored on, or otherwise accessible by, memory remote from the vehicle 502, such as, for example, on memory 548 of a remote computing device 550). Similarly, the object trajectory component 540, intersection component 542, probability component 544, and/or action component 546 are depicted as residing in the memory 538 of the vehicle safety system 534, one or more of these components may additionally, or alternatively, be implemented within vehicle computing device(s) 504 or may be accessible to the vehicle 502 (e.g., stored on, or otherwise accessible by, memory remote from the vehicle 502, such as, for example, on memory 548 of a remote computing device 550).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 528 and/or map component 528, and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 524 can implement one or more tree search algorithms to determine the path for the vehicle 502. For instance, the planning component 524 can implement the model component 530 (having at least the functionality of the model component 104 of FIG. 1) to apply a tree search algorithm to a decision tree to determine a vehicle trajectory for the vehicle 502. In some examples, the vehicle computing device(s) 504 can exchange data with the computing device(s) 550 including sending log data associated with the tree search algorithm to the computing device(s) 550 and receiving updated or optimized algorithms from the computing device(s) 550.

In some examples, the planning component 524 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 502. In some examples, the planning component 524 can include or otherwise perform the functionality associated with the decision tree component 304 and/or the sample determination component 306.

In at least one example, the vehicle computing device 504 may include one or more system controllers 526, which may be configured to control steering, propulsion, braking, safety, emitters, communication, and other systems of the vehicle 502. The system controller(s) 526 may communicate with and/or control corresponding systems of the drive system(s) 514 and/or other components of the vehicle 502.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 528. That is, the map(s) 528 may be used in connection with the localization component 520, the perception component 522, and/or the planning component 524 to determine a location of the vehicle 502, detect or determine gravity, detect objects in an environment, generate routes, determine actions and/or trajectories to navigate within an environment.

In some examples, the one or more maps 528 may be stored on a remote computing device(s) (such as the computing device(s) 550) accessible via network(s) 556. In some examples, multiple maps 528 may be stored based on, for example, a characteristic (e.g., type of entity, time of day, day of week, season of the year, etc.). Storing multiple maps

528 may have similar memory requirements, but increase the speed at which data in a map may be accessed.

As illustrated in FIG. 5, the vehicle computing device 504 may include a model component 530. The model component 530 may be configured to determine probabilities for an intersection between an object in an environment of the vehicle 502. For instance, the model component 530 can determine the output data 106 of FIG. 1. In various examples, the model component 530 may receive sensor data associated with an object from the localization component 520, the perception component 522, and/or from the sensor system(s) 506. In some examples, the model component 530 may receive map data from the localization component 520, the perception component 522, the maps 528, and/or the sensor system(s) 506. While shown separately in FIG. 5, the model component 530 could be part of the localization component 520, the perception component 522, the planning component 524, or other component(s) of the vehicle 502.

In various examples, the model component 530 may send output(s) from the first model 532A, the second model 532B, and/or the Nth model 532N may be used by the perception component 522 to alter or modify an amount of perception performed in an area of the object based on an associated intersection value. In some examples, the planning component 524 may determine one or more actions (e.g., reference actions and/or sub-actions) for the vehicle 502 based at least in part on output(s) from the model component 530. In some examples, the model component 530 may be configured to output information indicating a vehicle trajectory to avoid an object likely to cause a collision. In some examples, the model component 530 may include at least the functionality provided by the model component 104 of FIG. 1.

In some examples, the model component 530 may communicate an output to the perception component 522 to cause an update to one or more parameters (e.g., bias values, drift values, and the like) associated with the sensor system(s) 506. In some examples, the model component 530 may communicate an output to the planning component 524 for consideration in planning operations (e.g., determining a final vehicle trajectory).

In various examples, the model component 530 may utilize machine learning techniques to determine an object intent, a node of a decision tree, a vehicle trajectory, an object position, an intersection probability, and so on, as described with respect to FIG. 1 and elsewhere. In such examples, machine learning algorithms may be trained to predict a vehicle trajectory with improved accuracy over time.

The vehicle safety system 534 may include an object trajectory component 540 configured to determine a trajectory for the vehicle 502 and/or trajectories for other objects identifying within an environment, using the various systems and techniques described herein. In some examples, the object trajectory component 540 may receive planning data, perception data, and/or map data from the components 520-526 to determine a planned trajectory for the vehicle 502 and trajectories for the other objects in the environment.

In some examples, the object trajectory component 540 determine a single planned trajectory for the vehicle 502 (e.g., based on planning data and map data received from the planning component 524 and maps 528, and may determine multiple trajectories for one or more other moving objects (e.g., vehicle 108) in the environment in which the vehicle 502 is operating. In some examples, the trajectories of another object may include any number of possible paths in which the object may travel from a current position (e.g., at the time of perception) and/or based on a direction of travel. Based on the determination that the agent is within the threshold distance or time to the vehicle 502, the object trajectory component 540 may determine the trajectories associated with the object. In some examples, the object trajectory component 540 may be configured to determine the possible trajectories of each detected moving object in the environment.

In various examples, the action component 546 may determine one or more actions for the vehicle 502 to take, based on predictions and/or probability determinations of an intersection between the vehicle 502 another object (e.g., vehicle 102), along with other factors. The action may include slowing the vehicle to yield to the object, stopping the vehicle to yield to the object, changing lanes or swerving left, or changing or swerving lanes right, etc. Based on the determined action, the vehicle computing device(s) 504, such as through the system controller(s) 526, may cause the vehicle 502 to perform the action. In at least some examples, such an action may be based on the probability of collision, determined by the probability component 544 based on multiple trajectories for the object, as described in detail. In various examples, responsive to determining to adjust a lateral position of the vehicle, such as in a lane change to the left or to the right, the vehicle safety system 534 may cause the components 540-546 to generate an updated vehicle trajectory, plot additional object trajectories with respect to the updated vehicle trajectory, determine updated potential collision zones, and perform time-space overlap analyses to determine whether an intersection risk may still exist after the determined action is performed by the vehicle 502.

The action component 546 may determine, in some examples, one or more actions for the vehicle 502 to take, based on receiving a signal form the model component 530. For instance, the model component 530 can determine an intersection probability between the vehicle 502 and one or more objects and generate a signal for sending to the action component 546.

As can be understood, the components discussed herein (e.g., the localization component 520, the perception component 522, the planning component 524, the one or more system controllers 526, the one or more maps 528, and the vehicle safety system 534 including the object trajectory component 540, the intersection component 542, the probability component 544, and the action component 546 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 518 (and the memory 548, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 556, to the one or more computing device(s) 550 at a particular frequency, after a lapse of a predetermined period of time, in near real-time, etc. In some examples, the model component 530 may receive sensor data from one or more of the sensor system(s) 506.

The vehicle 502 may also include one or more emitters 508 for emitting light and/or sound. The emitters 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 550, other nearby vehicles, etc.) and/or one or more remote sensor system(s) 558 for receiving sensor data. The communication connection(s) 510 also enable the vehicle 502 to communicate with a remote teleoperations computing device or other remote services.

The communication connection(s) 510 may include physical and/or logical interfaces for connecting the vehicle computing device 504 to another computing device or a network, such as network(s) 556. For example, the communication connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the planning component 524, the one or more system controllers 526, the one or more maps 528, and the model component 530, may process sensor data, as described above, and may send their respective outputs, over the one or more network(s) 556, to the computing device(s) 550. In at least one example, the localization component 520, the perception component 522, the planning component 524, the one or more system controllers 526, the one or more maps 528, and the model component 530 may send their respective outputs to the computing device(s) 550 at a particular frequency, after a lapse of a predetermined period of time, in near real-time, etc.

In some examples, the vehicle 502 may send sensor data to the computing device(s) 550 via the network(s) 556. In some examples, the vehicle 502 may receive sensor data from the computing device(s) 550 and/or remote sensor system(s) 558 via the network(s) 556. The sensor data may include raw sensor data and/or processed sensor data and/or representations of sensor data. In some examples, the sensor data (raw or processed) may be sent and/or received as one or more log files.

The computing device(s) 550 may include processor(s) 552 and a memory 548 storing a training component 554.

In some instances, the training component 554 can include functionality to train a machine learning model to output values, parameters, and the like associated with one or more algorithms. For example, the training component 554 can receive data that represents log data (e.g., publicly available data, sensor data, and/or a combination thereof) associated with a real-world environment. At least a portion of the log data can be used as an input to train the machine learning model. As a non-limiting example, sensor data, audio data, image data, map data, inertia data, vehicle state data, historical data (log data), or a combination thereof may be input into the machine learned model. Thus, by providing data where the vehicle traverses an environment, the training component 554 can be trained to output a vehicle trajectory that avoids objects in the real-world environment, as discussed herein.

In some examples, the training component 554 may be implemented to train the model component 530. Training data may include a wide variety of data, such as image data, video data, lidar data, radar data, audio data, other sensor data, observed trajectories of objects, labelled data (e.g., labelled collision data, labelled object intent data), etc., that is associated with a value (e.g., a desired classification, inference, prediction, etc.). Such data and associated values may generally be referred to as a "ground truth." In such examples, the training component 554 may determine a difference between the ground truth (e.g., training data) and output(s) by the model component 530. Based at least in part on the difference(s), training by the training component 554 may include altering a parameter of the machine-learned model to minimize the difference(s) to obtain a trained machine-learned model that is configured to determine potential intersection(s) between object(s) in the environment and the vehicle 502.

In various examples, during training, the model component 530 may adjust weights, filters, connections between layers, and/or parameters for training the individual untrained neural networks to predict potential intersection(s) (or other tasks), as discussed herein. In some instances, the model component 530 may use supervised or unsupervised training.

In some examples, the training component 554 can include training data that has been generated by a simulator. For example, simulated training data can represent examples where a vehicle collides with an object in an environment or nearly collides with an object in an environment, to provide additional training examples.

In some examples, functionality provided by the training component 554 may be included and/or performed by the vehicle computing device 504.

The processor(s) 516 of the vehicle 502, processor(s) 536 of the vehicle safety system 534, and/or the processor(s) 552 of the computing device(s) 550 may be any suitable processor capable of executing instructions to process data and perform operations as described herein. By way of example and not limitation, the processor(s) 516, 536, and 552 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518, memory 538, and memory 548 are examples of non-transitory computer-readable media. The memory 518, the memory 538, and/or memory 548 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518, the memory 538, and memory 548 may include at least a working memory and a storage memory. For example, the working memory may be a high-speed memory of limited capacity (e.g., cache memory) that is used for storing data to be operated on by the processor(s) 516, 536, and/or 552. In some instances, the memory 518, the memory 538, and memory 548 may include a storage memory that may be a lower-speed memory of relatively large capacity that is used for long-term storage of data. In some cases, the processor(s) 516, 536, and/or 552 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 550 and/or components of the computing device(s) 550 may be associated with the vehicle 502. That is, the vehicle 502 may perform one or more of the functions associated with the computing device(s) 550, and vice versa. For instance, either the vehicle 502 and/or the computing device(s) 550 may perform training operations relating to one or more of the models described herein.

Figure 6:
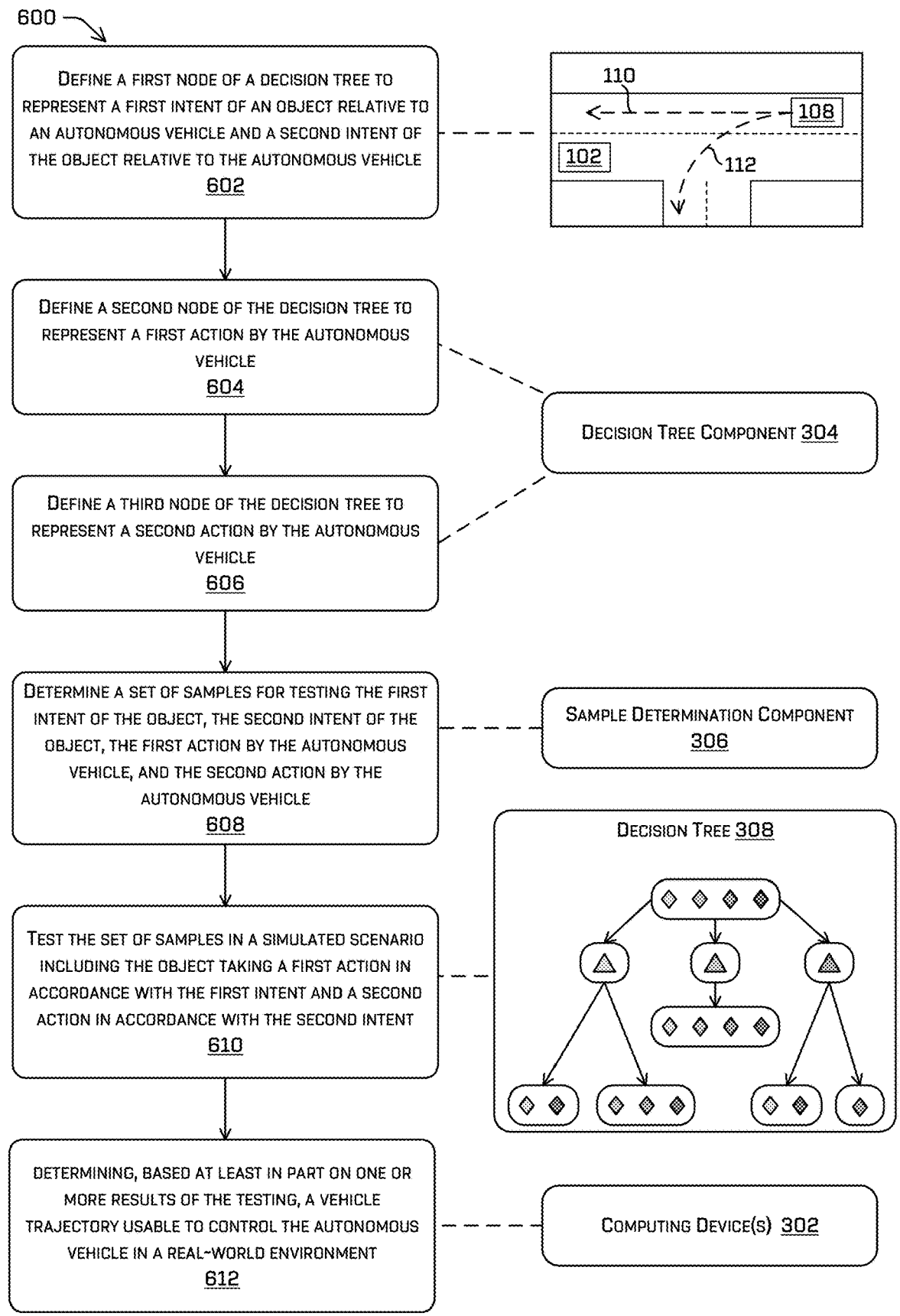
FIG. 6 is a flowchart depicting an example process for determining a vehicle trajectory using one or more example models.

FIG. 6 is a flowchart depicting an example process 600 for determining a vehicle trajectory using one or more example models. Some or all of the process 600 may be performed by one or more components in FIGS. 1-5, as described herein. For example, some or all of process 600 may be performed by the vehicle computing device 504 of FIG. 5 and/or the computing device(s) 550.

At operation 602, the process may include defining a first node of a decision tree to represent a first intent of an object relative to an autonomous vehicle and a second intent of the object relative to the autonomous vehicle. For example, the vehicle computing device 504 can implement the model component 530 generate object trajectories for one or more objects in an environment of a vehicle. In some examples, the object trajectories (e.g., the first object trajectory 112 and the second object trajectory 114) can cause the object to behave differently relative to the autonomous vehicle. In various examples, the object trajectories can be based at least in part on sensor data from the perception component 522 and map data from the map(s) 528. In some examples, the first intent and the second intent of the object can represent a potential turning action, or a level of reactiveness by the object relative to the autonomous vehicle.

At operation 604, the process may include defining a second node of the decision tree to represent a first action by the autonomous vehicle. In some examples, the decision tree component 304 can determine the second node 316, the third node 318, or the fourth node 320 to represent a potential action by the autonomous vehicle (though different number of vehicle action(s) can be used in other examples). In some examples, a number of vehicle actions, or nodes associated therewith, can be determined based at least in part on a number of object intent.

At operation 606, the process may include defining a third node of the decision tree to represent a second action by the autonomous vehicle. For instance, the decision tree component 304 can associate another potential action by the vehicle with another node of the decision tree 308 (e.g., the second node 316, the third node 318, or the fourth node 320).

At operation 608, the process may include determining a set of samples for testing the first intent of the object, the second intent of the object, the first action by the autonomous vehicle, and the second action by the autonomous vehicle. For example, the sample determination component 306 can be configured to determine samples for identifying whether the vehicle and the object intersect in accordance with the vehicle actions and the object intents.

At operation 610, the process may include testing the set of samples in a simulated scenario including the object taking a first action in accordance with the first intent and a second action in accordance with the second intent. For instance, the operation 610 can include the model component 104 applying a tree search algorithm to the decision tree 308 including identifying different paths through different nodes to simulate potential interactions. In some examples, the tree search algorithm can be determined by a machine learned model trained to improve a cost gap distribution.

At operation 612, the process may include determining, based at least in part on one or more results of the testing, a vehicle trajectory usable to control the autonomous vehicle in a real-world environment. For example, the operation 612 may include determining the vehicle trajectory based at least in part on a lowest cost to traverse the decision tree (e.g., selecting a trajectory by a combination of nodes that result in a lowest combined cost). In some examples, the model component 104 can send the vehicle trajectory to a vehicle computing device of the autonomous vehicle. In various examples, the vehicle computing device is configured to determine a trajectory for the vehicle (e.g., the vehicle trajectory 116) based at least in part on the output. For example, an output from the model component 530 can be sent to the perception component 522 or the planning component 524, just to name a few. In various examples, the vehicle computing device may control operation of the vehicle, such as the planning component 524. The vehicle computing device may determine a final vehicle trajectory based at least in part on the vehicle trajectory thereby improving vehicle safety by planning for the possibility that the object may intersect with the vehicle in the future. Additional details of controlling a vehicle using one or more outputs are discussed throughout the disclosure.

FIGS. 2 and 6 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. By way of example and not limitation, operations 602, 604, 608, and 610 may be performed without operations 606 and 612. Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the one or more processors to perform operations comprising: defining a first node of a decision tree to represent a first intent of an object relative to an autonomous vehicle and a second intent of the object relative to the autonomous vehicle; defining a second node of the decision tree to represent a first action by the autonomous vehicle; defining a third node of the decision tree to represent a second action by the autonomous vehicle; determining a set of samples for testing the first intent of the object, the second intent of the object, the first action by the autonomous vehicle, and the second action by the autonomous vehicle; testing the set of samples in a simulated scenario including the object taking a first action in accordance with the first intent and a second action in accordance with the second intent; and determining, based at least in part on one or more results of the testing, a vehicle trajectory usable to control the autonomous vehicle in a real-world environment.

B: The system of paragraph A, the operations further comprising: determining a cost for a sample in the set of samples, the cost representing an impact to operation of the autonomous vehicle; and controlling the autonomous vehicle based at least in part on the cost.

C: The system of paragraph A or B, wherein determining the vehicle trajectory is based at least in part on applying a tree search algorithm to the decision tree.

D: The system of any of paragraphs A-C, the operations further comprising: determining a number of branches of the decision tree based at least in part on a probability that processing an additional branch results in a vehicle trajectory determination having a cost that is lower than a cost associated with a previous vehicle trajectory determination.

E: The system of any of paragraphs A-D, wherein: the first action or the second action represents one of: a yield action, a drive straight action, a left turn action, a right turn action, a brake action, an acceleration action, a steering action, or a lane change action, and the first intent or the second intent represents one of: a first likelihood that the object reacts to the autonomous vehicle using a first behavior during the simulated scenario, a second likelihood that the object reacts to the autonomous vehicle using a second behavior during the simulated scenario, or a third likelihood that the object refrains from reacting to the autonomous vehicle during the simulated scenario.

F: One or more non-transitory computer-readable media storing instructions that, when executed, cause one or more processors to perform operations comprising: defining a decision tree to include a first node defining a proposed action for a vehicle to take at a future time and a second node associated with an object intent at the future time; generating, based at least in part on the decision tree, a simulation including the object taking an action in accordance with the object intent, the object intent representing a response of the object relative to the proposed action of the vehicle; and controlling the vehicle based at least in part on an output of the simulation.

G: The one or more non-transitory computer-readable media of paragraph F, the operations further comprising: identifying a relevant object from among a set of objects in an environment of the vehicle based at least in part on a relevancy score, wherein the object intent is associated with the relevant object.

H: The one or more non-transitory computer-readable media of paragraph F or G, wherein the simulation comprises a set of samples representing potential interactions between the vehicle and an object at a future time based on a control policy of the vehicle and the object intent, and the operations further comprising: determining a cost for a sample in the set of samples, the cost representing an impact to operation of the vehicle; and controlling the vehicle based at least in part on the cost.

I: The one or more non-transitory computer-readable media of any of paragraphs F-H, wherein generating the simulation comprises: testing a set of samples in a simulated scenario including testing each sample in the set of samples over a time period.

J: The one or more non-transitory computer-readable media of any of paragraphs F-I, the operations further comprising: determining a number of branches of the decision tree based at least in part on a probability that processing an additional branch results in a vehicle trajectory determination having a cost that is lower than a cost associated with a previous vehicle trajectory determination.

K: The one or more non-transitory computer-readable media of any of paragraphs F-J, wherein: the action by the vehicle represents one of: a yield action, a drive straight action, a left turn action, a right turn action, a brake action, an acceleration action, a steering action, or a lane change action.

L: The one or more non-transitory computer-readable media of any of paragraphs F-K, wherein: the object intent represents a first likelihood that an object reacts to the vehicle during the simulation or a second likelihood that the object refrains from reacting to the vehicle during the simulation.

M: The one or more non-transitory computer-readable media of any of paragraphs F-L, the operations further comprising: defining a first node of the decision tree to represent the object intent; and defining a second node of the decision tree to represent the action by the vehicle.

N: The one or more non-transitory computer-readable media of any of paragraphs F-M, wherein the object intent is a first object intent, and the operations further comprising: grouping the first object intent and a second object intent associated with the object in a node of the decision tree, wherein controlling the vehicle is further based at least in part on applying a tree search algorithm to the node of the decision tree.

O: The one or more non-transitory computer-readable media of any of paragraphs F-N, the operations further comprising: determining a vehicle trajectory for the vehicle based at least in part on applying a tree search algorithm to the decision tree, and controlling the vehicle comprises using the vehicle trajectory to navigate in an environment.

P: The one or more non-transitory computer-readable media of any of paragraphs F-O, wherein the object intent is a first object intent associated with a first object, and the operations further comprising: defining the decision tree to include a third node associated with a second object intent associated with a second object different from the first object; and determining a vehicle trajectory to control the vehicle based at least in part on applying a tree search algorithm to the third node of the decision tree.

Q: A method comprising: defining a decision tree to include a first node defining a proposed action for a vehicle to take at a future time and a second node associated with an object intent at the future time; generating, based at least in part on the decision tree, a simulation including the object taking an action in accordance with the object intent, the object intent representing a response of the object relative to the proposed action of the vehicle; and controlling the vehicle based at least in part on an output of the simulation.

R: The method of paragraph Q, further comprising: identifying a relevant object from among a set of objects in an environment of the vehicle, wherein the object intent is associated with the relevant object.

S: The method of paragraph Q or R, wherein: the action by the vehicle represents one of: a yield action, a drive straight action, a left turn action, a right turn action, a brake action, an acceleration action, a steering action, or a lane change action.

T: The method of any of paragraphs Q-S, wherein: the object intent represents a first likelihood that an object reacts to the vehicle during the simulation or a second likelihood that the object refrains from reacting to the vehicle during the simulation.

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the one or more processors to perform operations comprising:
   defining a first node of a decision tree to represent a first intent of an object relative to an autonomous vehicle and a second intent of the object relative to the autonomous vehicle;
   defining a second node of the decision tree to represent a first an action by the autonomous vehicle;
   determining a set of samples for testing the first intent of the object, the second intent of the object, and the action by the autonomous vehicle;
   testing the set of samples in a simulated scenario including the object taking a first action in accordance with the first intent and a second action in accordance with the second intent; and
   determining, based at least in part on one or more results of the testing, a vehicle trajectory used to control driving of the autonomous vehicle in a real-world environment.

2. The system of claim 1, the operations further comprising:
   determining a cost for a sample in the set of samples, the cost representing an impact to operation of the autonomous vehicle; and
   controlling the autonomous vehicle based at least in part on the cost.

3. The system of claim 1, wherein determining the vehicle trajectory is based at least in part on applying a tree search algorithm to the decision tree.

4. The system of claim 1, the operations further comprising:
determining a number of branches of the decision tree based at least in part on a probability that processing an additional branch results in a vehicle trajectory determination having a cost that is lower than a cost associated with a previous vehicle trajectory determination.

5. The system of claim 1, wherein:
the action by the autonomous vehicle represents one of: a yield action, a drive straight action, a left turn action, a right turn action, a brake action, an acceleration action, a steering action, or a lane change action, and
the first intent or the second intent represents one of: a first likelihood that the object reacts to the autonomous vehicle using a first behavior during the simulated scenario, a second likelihood that the object reacts to the autonomous vehicle using a second behavior during the simulated scenario, or a third likelihood that the object refrains from reacting to the autonomous vehicle during the simulated scenario.

6. One or more non-transitory computer-readable media storing instructions that, when executed, cause one or more processors to perform operations comprising:
defining a decision tree to include a first node defining a proposed action for a vehicle to take at a future time and a second node associated with a first object intent of an object at the future time;
grouping the first object intent and a second object intent associated with the object in the second node of the decision tree;
generating, based at least in part on the decision tree, a simulation including the object taking an action in accordance with the first object intent, the first object intent representing a response of the object relative to the proposed action of the vehicle; and
controlling driving of the vehicle based at least in part on an output of the simulation and applying a tree search algorithm to the second node of the decision tree.

7. The one or more non-transitory computer-readable media of claim 6, the operations further comprising:
identifying a relevant object from among a set of objects in an environment of the vehicle based at least in part on a relevancy score,
wherein the first object intent or the second object intent is associated with the relevant object.

8. The one or more non-transitory computer-readable media of claim 6, wherein the simulation comprises a set of samples representing potential interactions between the vehicle and an object at a future time based on a control policy of the vehicle and the first object intent or the second object intent, and the operations further comprising:
determining a cost for a sample in the set of samples, the cost representing an impact to operation of the vehicle; and
controlling the vehicle based at least in part on the cost.

9. The one or more non-transitory computer-readable media of claim 6, wherein generating the simulation comprises:
testing a set of samples in a simulated scenario including testing each sample in the set of samples over a time period.

10. The one or more non-transitory computer-readable media of claim 6, the operations further comprising:
determining a number of branches of the decision tree based at least in part on a probability that processing an additional branch results in a vehicle trajectory determination having a cost that is lower than a cost associated with a previous vehicle trajectory determination.

11. The one or more non-transitory computer-readable media of claim 6, wherein:
the action by the vehicle represents one of: a yield action, a drive straight action, a left turn action, a right turn action, a brake action, an acceleration action, a steering action, or a lane change action.

12. The one or more non-transitory computer-readable media of claim 6, wherein:
the first object intent or the second object intent represents a first likelihood that an object reacts to the vehicle during the simulation or a second likelihood that the object refrains from reacting to the vehicle during the simulation.

13. The one or more non-transitory computer-readable media of claim 6, the operations further comprising:
defining the first node of the decision tree to represent the first object intent; and
defining the second node of the decision tree to represent the action by the vehicle.

14. The one or more non-transitory computer-readable media of claim 6, the operations further comprising:
determining a vehicle trajectory for the vehicle based at least in part on applying a tree search algorithm to the decision tree, and
controlling the vehicle comprises using the vehicle trajectory to navigate in an environment.

15. The one or more non-transitory computer-readable media of claim 6, wherein the object is a first object, and the operations further comprising:
defining the decision tree to include a third node associated with a third object intent associated with a second object different from the first object; and
determining a vehicle trajectory to control the vehicle based at least in part on applying a tree search algorithm to the third node of the decision tree.

16. A method comprising:
defining a decision tree to include a first node defining a proposed action for a vehicle to take at a future time and a second node associated with a first object intent of an object at the future time;
grouping the first object intent and a second object intent associated with the object in the second node of the decision tree;
generating, based at least in part on the decision tree, a simulation including the object taking an action in accordance with the first object intent, the first object intent representing a response of the object relative to the proposed action of the vehicle; and
controlling driving of the vehicle based at least in part on an output of the simulation and applying a tree search algorithm to the second node of the decision tree.

17. The method of claim 16, further comprising:
identifying a relevant object from among a set of objects in an environment of the vehicle,
wherein the first object intent or the second object intent is associated with the relevant object.

18. The method of claim 16, wherein:
the action by the vehicle represents one of: a yield action, a drive straight action, a left turn action, a right turn action, a brake action, an acceleration action, a steering action, or a lane change action.

19. The method of claim 16, wherein:
the object intent represents a first likelihood that an object reacts to the vehicle during the simulation or a second likelihood that the object refrains from reacting to the vehicle during the simulation.

20. The method of claim 16, further comprising:
determining a vehicle trajectory for the vehicle based at least in part on applying a tree search algorithm to the decision tree, and
controlling the vehicle comprises using the vehicle trajectory to navigate in an environment.

\* \* \* \* \*